United States Patent
Woodworth et al.

(10) Patent No.: US 10,940,932 B2
(45) Date of Patent: Mar. 9, 2021

(54) MODULAR FUSELAGE FOR UNMANNED AERIAL VEHICLE

(71) Applicant: Wing Aviation LLC, Mountain View, CA (US)

(72) Inventors: Adam Woodworth, San Jose, CA (US); Adem Rudin, Mountain View, CA (US); Stephen Benson, San Carlos, CA (US); James Schmalzried, San Jose, CA (US); Kyle Liske, San Francisco, CA (US); Jesse Blake, Sunnyvale, CA (US); André Prager, Sunnyvale, CA (US); Nicolas Renold, Mountain View, CA (US); Evan Twyford, Mountain View, CA (US)

(73) Assignee: Wing Aviation LLC, Mountain View, CA (US)

(*) Notice: Subject to any disclaimer, the term of this patent is extended or adjusted under 35 U.S.C. 154(b) by 275 days.

(21) Appl. No.: 15/730,420

(22) Filed: Oct. 11, 2017

(65) Prior Publication Data
US 2019/0106192 A1 Apr. 11, 2019

(51) Int. Cl.
*B64C 1/06* (2006.01)
*B64C 39/02* (2006.01)
(Continued)

(52) U.S. Cl.
CPC .......... *B64C 1/069* (2013.01); *B64C 29/0025* (2013.01); *B64C 39/024* (2013.01);
(Continued)

(58) Field of Classification Search
CPC ........... B64C 1/069; B64C 1/068; B64C 1/30; B64C 29/0025; B64C 39/024;
(Continued)

(56) References Cited

U.S. PATENT DOCUMENTS 6,056,237 A * 5/2000 Woodland ................. B64C 3/40
244/3.15
6,626,398 B1 9/2003 Cox et al.
(Continued)

FOREIGN PATENT DOCUMENTS

CN 203528816 U 4/2014
WO 2012/006158 A1 1/2012

OTHER PUBLICATIONS

International Search Report and Written Opinion from the International Searching Authority dated Dec. 11, 2018 or International Application No. PCT/US2018/050958, filed Sep. 13, 2018, 14 pages.

(Continued)

*Primary Examiner* — Medhat Badawi
*Assistant Examiner* — Vicente Rodriguez
(74) *Attorney, Agent, or Firm* — Christensen O'Connor Johnson Kindness PLLC

(57) ABSTRACT

A modular fuselage for an unmanned aerial vehicle (UAV) includes a battery module, an avionics module, and a mission payload module. The battery module houses a battery to power the UAV. The avionics module houses flight control circuitry of the UAV. The mission payload module houses equipment associated with a mission of the UAV. The battery module, the avionics module, and the mission payload module are detachable from each other and mechanically securable to each other to contiguously form at least a portion of the modular fuselage of the UAV.

24 Claims, 10 Drawing Sheets

(51) Int. Cl.
*B64C 29/00* (2006.01)
*B64C 27/26* (2006.01)

(52) U.S. Cl.
CPC ........ *B64C 27/26* (2013.01); *B64C 2201/021* (2013.01); *B64C 2201/027* (2013.01); *B64C 2201/042* (2013.01); *B64C 2201/066* (2013.01); *B64C 2201/088* (2013.01); *B64C 2201/108* (2013.01); *B64C 2201/127* (2013.01); *B64C 2201/146* (2013.01); *B64C 2201/165* (2013.01); *B64C 2211/00* (2013.01)

(58) Field of Classification Search
CPC .............. B64C 39/02; B64C 2201/021; B64C 2201/027; B64C 2201/042; B64C 2201/066; B64C 2201/088; B64C 2201/102; B64C 2201/127; B64C 2201/146; B64C 2201/165; B64C 27/26; B64C 2211/00; B64C 27/22; B64C 25/52; B64C 39/028; B64D 41/00; A63H 27/02; B63B 22/003
See application file for complete search history.

(56) References Cited

U.S. PATENT DOCUMENTS

| | | | |
|---|---|---|---|
| 6,840,480 B2 * | 1/2005 | Carroll | B64C 39/024 244/117 R |
| 7,237,750 B2 | 7/2007 | Chiu et al. | |
| 8,152,096 B2 | 4/2012 | Smith | |
| 8,256,715 B2 | 9/2012 | Ballard et al. | |
| 9,045,226 B2 | 6/2015 | Piasecki et al. | |
| 9,120,560 B1 * | 9/2015 | Armer | B64C 29/0008 |
| 9,365,088 B2 * | 6/2016 | Belik | B64C 25/52 |
| 9,522,725 B2 | 12/2016 | Torre | |
| 9,623,969 B2 | 4/2017 | Nelson | |
| 9,688,400 B2 | 6/2017 | Hutson | |
| 10,071,802 B2 * | 9/2018 | Cardell | A63H 27/12 |
| 2003/0066932 A1 | 4/2003 | Carroll | |
| 2006/0011777 A1 * | 1/2006 | Arlton | B64C 39/024 244/7 B |
| 2006/0091258 A1 * | 5/2006 | Chiu | A45C 13/02 244/119 |
| 2006/0151666 A1 * | 7/2006 | Vandermey | B64C 29/0016 244/12.3 |
| 2009/0212157 A1 * | 8/2009 | Arlton | B64C 27/10 244/63 |
| 2012/0083945 A1 * | 4/2012 | Oakley | B64C 27/08 701/2 |
| 2013/0256464 A1 * | 10/2013 | Belik | B64C 35/008 244/4 R |
| 2014/0231593 A1 | 8/2014 | Karem | |
| 2014/0332620 A1 * | 11/2014 | Earon | B64C 39/024 244/13 |
| 2017/0036748 A1 | 2/2017 | Plater | |

OTHER PUBLICATIONS

"E-Turbine 250 LED FPV Racing Drone (ARE)", Retrieved from internet https://hobbyking.com/en_us/e-turbine-led-fpv-250-quadracer.html on Oct. 5, 2017, 6 pages.

Examination Report, dated Dec. 11, 2020, in corresponding Australian Patent Application No. 2018347855, 5 pages.

Written Opinion dated Oct. 5, 2020, in corresponding Singapore Patent Application No. 11202002478W, 5 pages.

\* cited by examiner

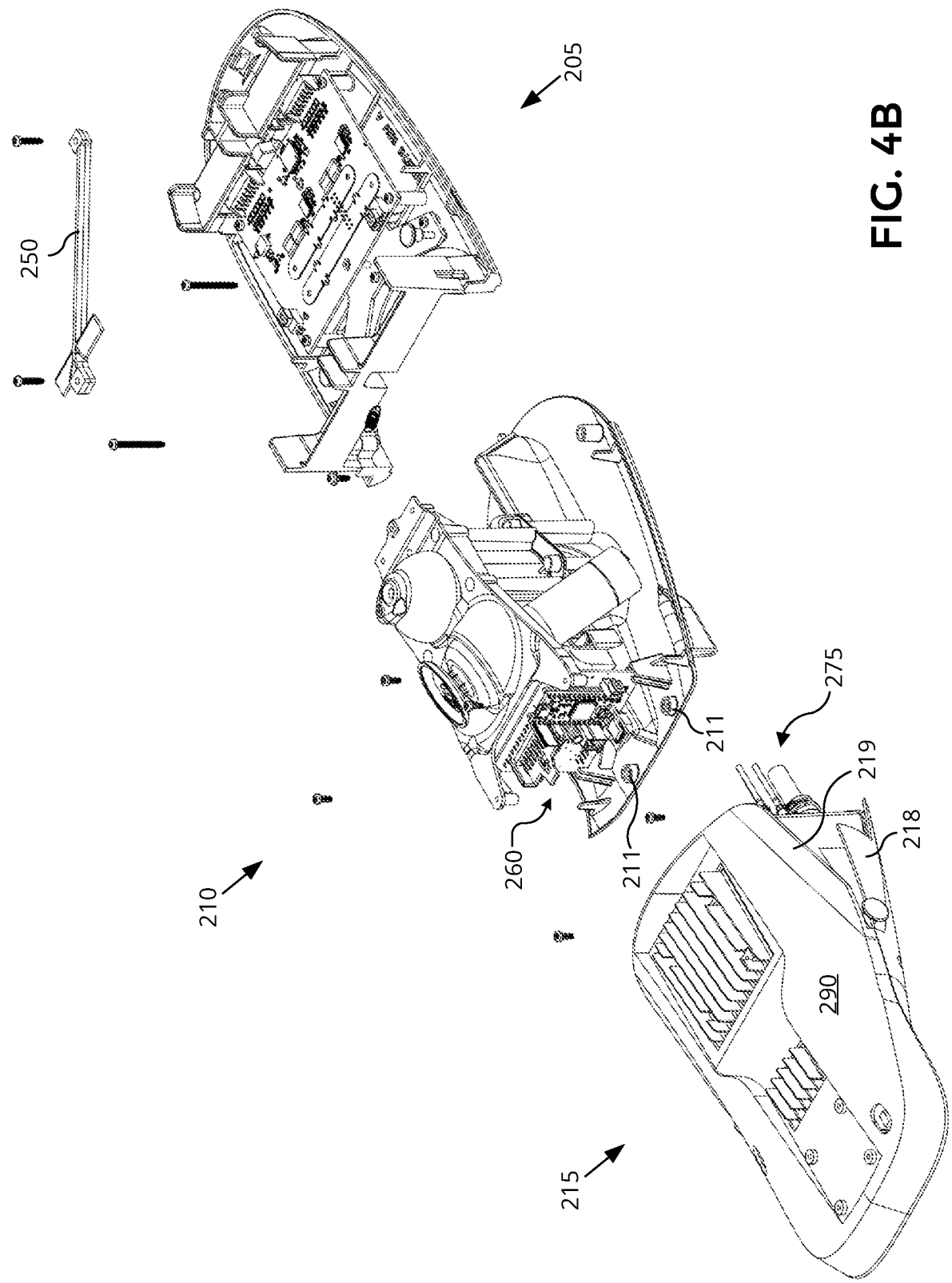

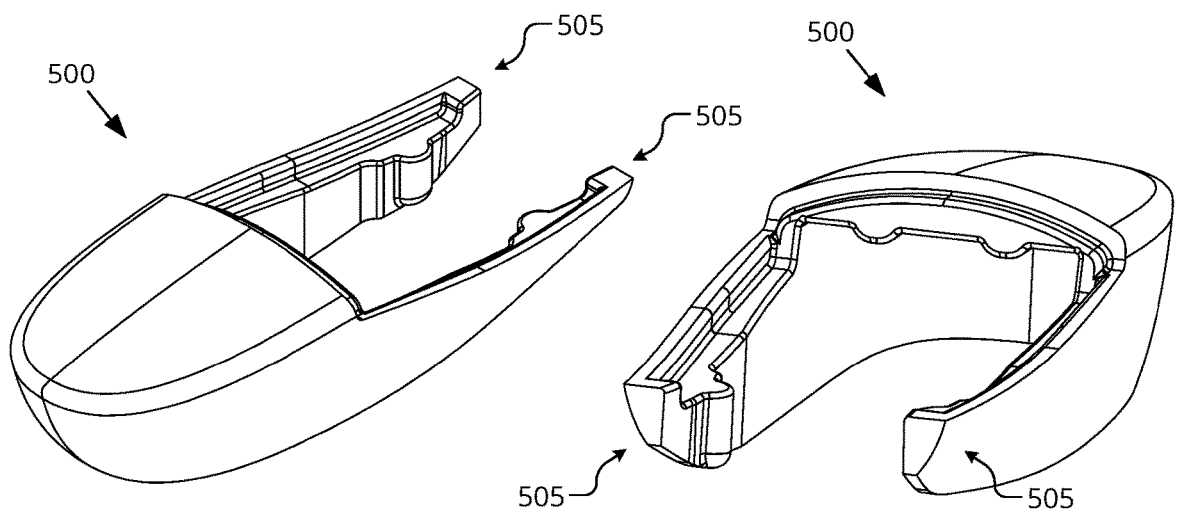
FIG. 5A  FIG. 5B
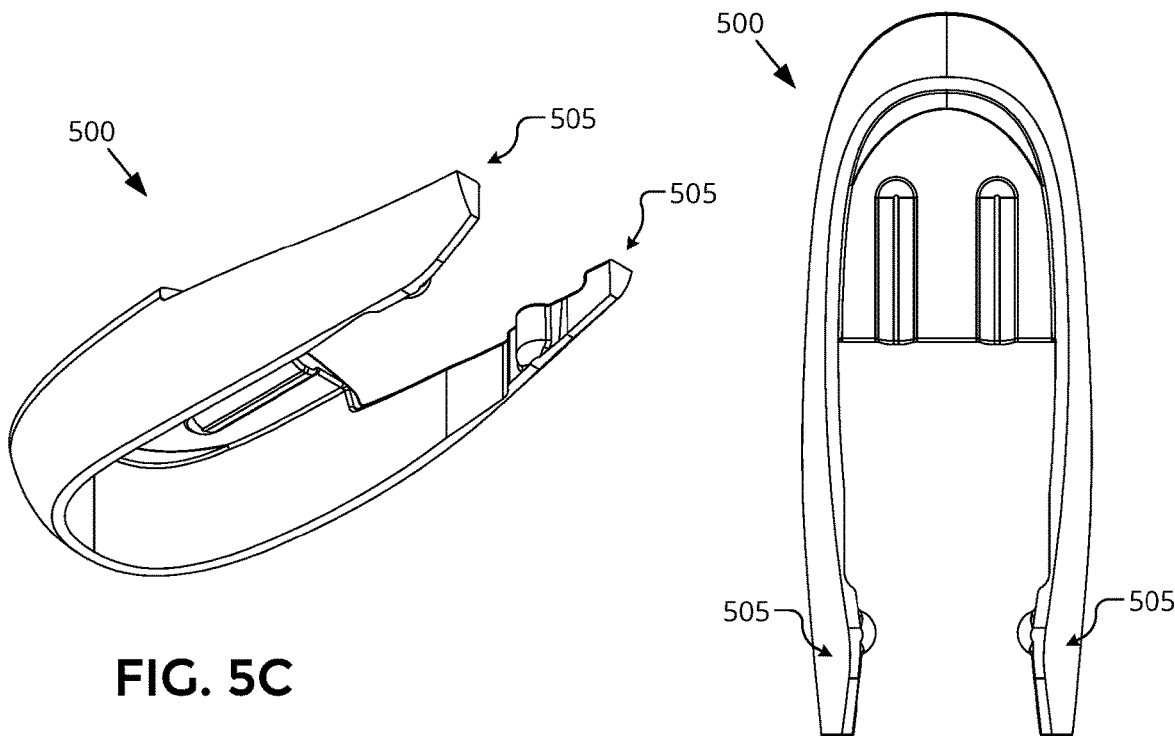
FIG. 5C  FIG. 5D

MODULAR FUSELAGE FOR UNMANNED AERIAL VEHICLE

TECHNICAL FIELD

This disclosure relates generally to the field of unmanned aerial vehicles.

BACKGROUND INFORMATION

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible. Unmanned vehicles may be provisioned to perform various different missions, including payload delivery, exploration/reconnaissance, imaging, public safety, surveillance, or otherwise. The mission definition will often dictate a type of specialized equipment and/or configuration of the unmanned vehicle.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIGS. 4A & 4B are perspective, exploded view illustrations of the unassembled modular fuselage, in accordance with an embodiment of the disclosure.

FIGS. 5A-C are perspective view illustrations of a fuselage cover, in accordance with an embodiment of the disclosure.

FIG. 5D is a bottom plan view illustration of the fuselage cover, in accordance with an embodiment of the disclosure.

DETAILED DESCRIPTION

Embodiments of a system and apparatus for an unmanned aerial vehicle (UAV) having a modular fuselage are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments described herein include an unmanned aerial vehicle (UAV), which refers to any autonomous or semi-autonomous vehicle that is capable of performing some functions without a physically present human pilot. A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

Figure 1A:
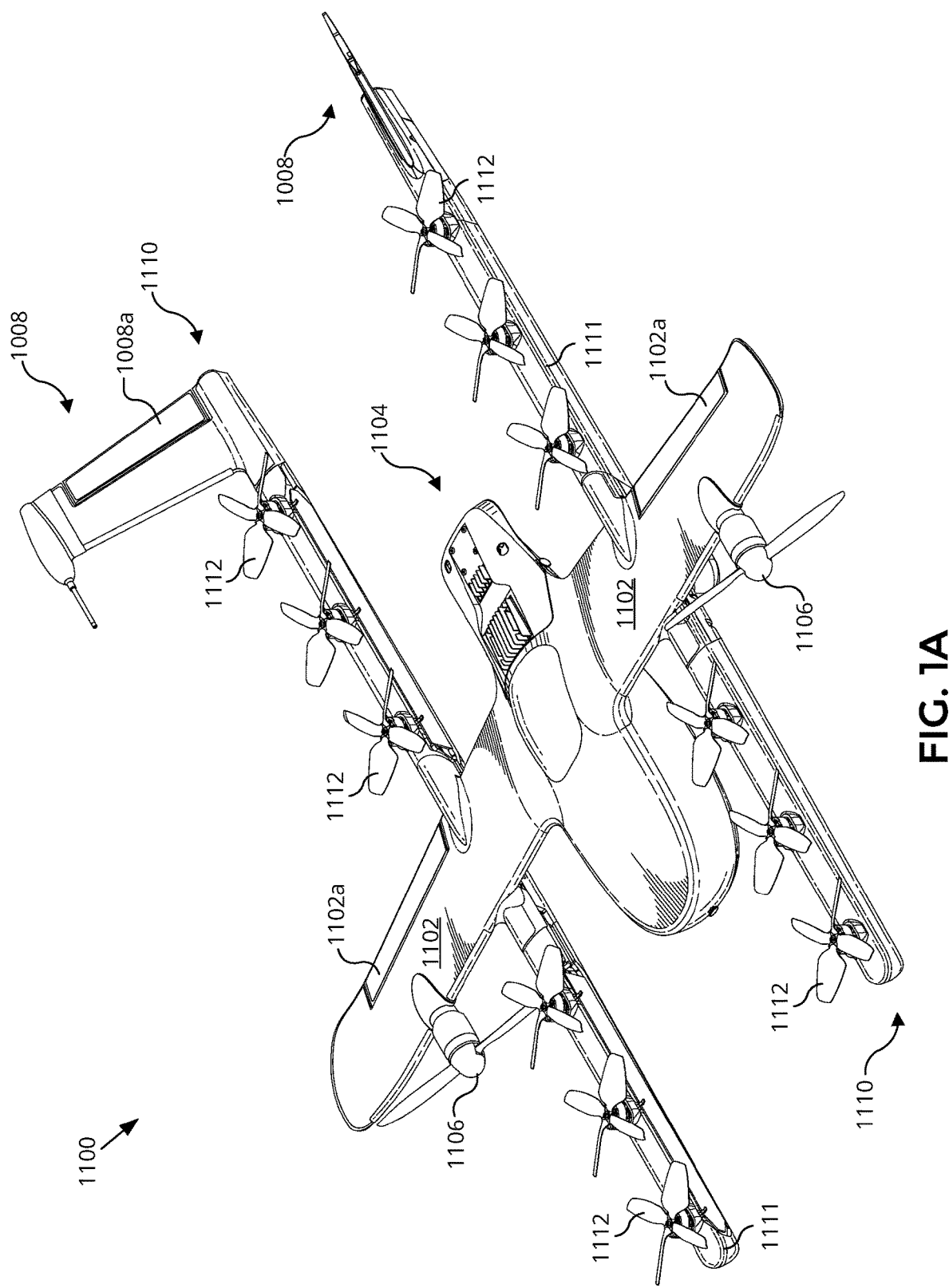
FIG. 1A is a perspective view illustration of an unmanned aerial vehicle (UAV) having a module fuselage, in accordance with an embodiment of the disclosure.
Figure 1B:
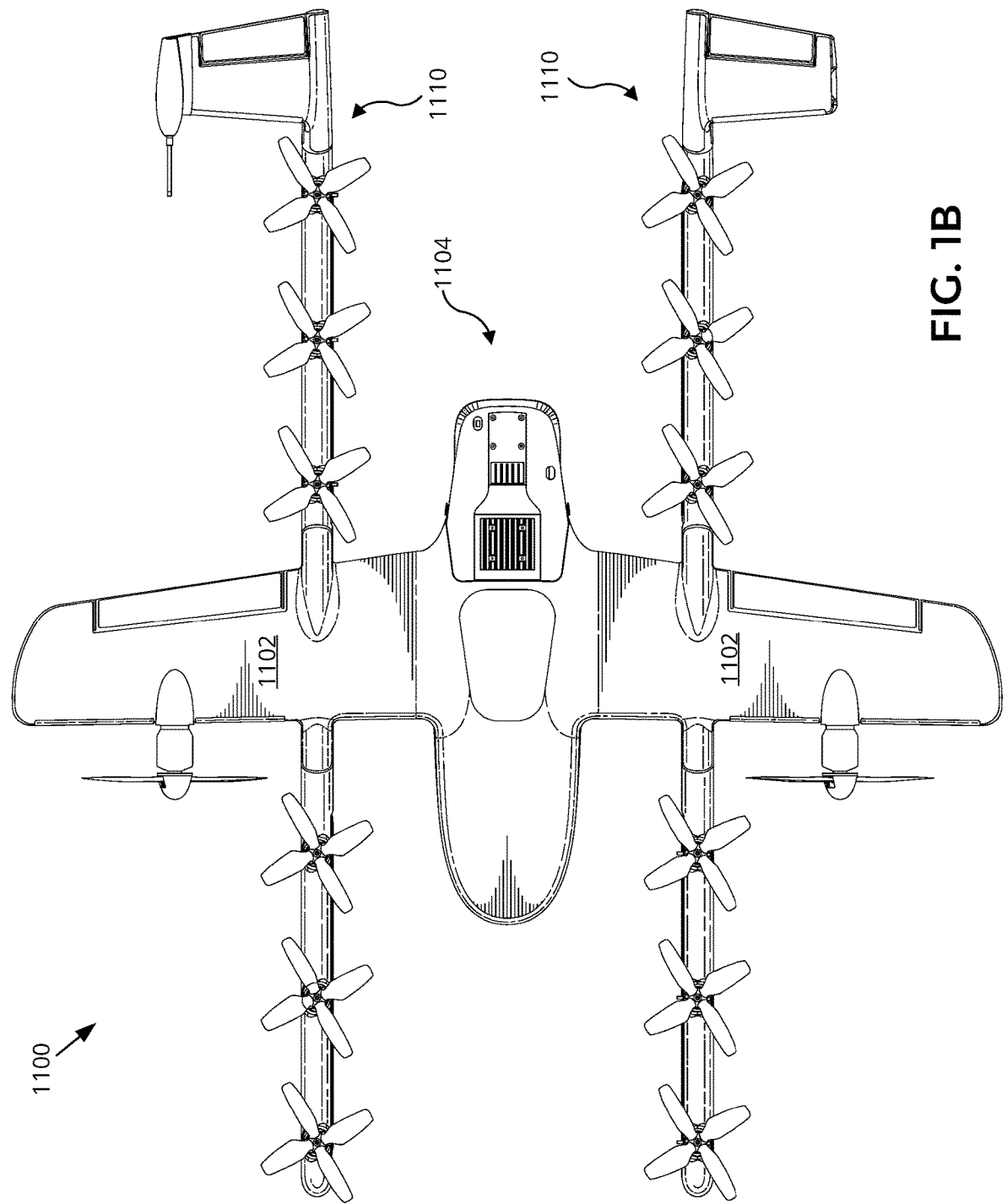
FIG. 1B is a top plan view illustration of the UAV having a module fuselage, in accordance with an embodiment of the disclosure.
Figure 1C:
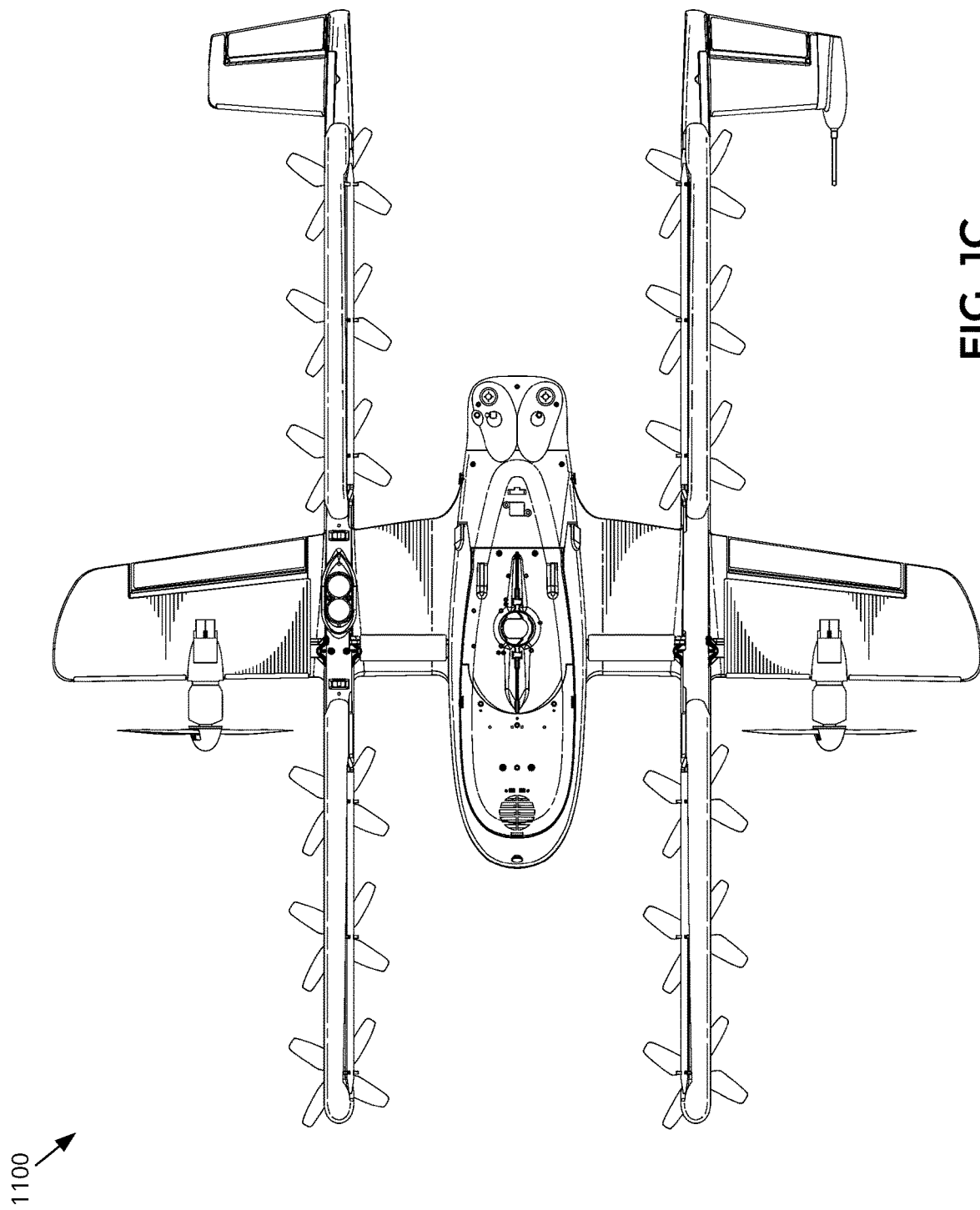
FIG. 1C is a bottom plan view illustration of the UAV having a module fuselage, in accordance with an embodiment of the disclosure.

FIG. 1A is a perspective view illustration of a UAV 1100 having a modular fuselage, according to an embodiment of the disclosure. FIG. 1B is a top plan view of UAV 1100 while FIG. 1C is a bottom plan view of the same. FIGS. 1A-C illustrate an example of a fixed-wing UAV 1100, which may also be referred to as an airplane, an aeroplane, a glider, or a plane, among other possibilities. The fixed-wing UAV 1100, as the name implies, has a wing assembly 1102 that generates lift based on the wing shape and the vehicle's forward airspeed. For instance, wing assembly 1102 may have an airfoil-shaped cross section to produce an aerodynamic lift force on the UAV 1100.

As depicted, UAV 1100 also includes a modular fuselage 1104. Modular fuselage 1104 includes a battery module, an avionics module, a mission payload module, and a fuselage cover. These modules are detachable from each other and mechanically securable to each other to contiguously form at least a portion of the fuselage or UAV main body. The modularity of modular fuselage 1104 is discussed in greater detail in connection with FIGS. 2-6.

The battery module houses one or more batteries for powering UAV 1100. The avionics module houses flight control circuitry of UAV 1100, which may include a processor and memory, communication electronics and antennas (e.g., cellular transceiver, wifi transceiver, etc.), and various sensors (e.g., global positioning sensor, an inertial measurement unit (IMU), etc.). The mission payload module houses equipment associated with a mission of UAV 1100. For example, the mission payload module may include a payload actuator for holding and releasing an externally attached payload. In this embodiment, a mission of UAV 1100 may be payload delivery. In another embodiment, the mission payload module may include a camera/sensor equipment holder for carrying camera/sensor equipment (e.g., camera, lenses, radar, lidar, pollution monitoring sensors, weather monitoring sensors, etc.). In this embodiment, a mission of UAV 1100 may be aerial imagery. In yet another embodiment, the mission payload module may include an additional battery holder to house additional or larger batteries for extended flight times. In this embodiment, a mission of UAV 1100 may be general flight. Of course, mission payload module may provide mix-use payload capacity (e.g., additional battery and camera equipment) for a variety of mix-use missions. The modular fuselage of UAV 1100 may also include landing gear and/or skid plates for controlled take-offs and landings.

The illustrated embodiment of UAV 1100 further includes forward propulsion units 1106 positioned on wing assembly 1102, which can each include a motor, shaft, and propeller, for propelling UAV 1100. The illustrated embodiment of UAV 1100 further includes two boom assemblies 1110 that secure to wing assembly 1102. In one embodiment, wing assembly 1102 includes a wing spar disposed within a wing foil. The wing spar may be a tubular rod extending along the internal length of the wing foil and provides a main structural member that connects wing assembly 1102 to modular fuselage 1104 and to which boom assemblies 1110 mount.

The illustrated embodiments of boom assemblies 1110 each include a boom 1111, vertical propulsion units 1112, printed circuit boards 1113, and stabilizers 1108. Vertical propulsion units 1112 can each include a motor, shaft, and propeller, for providing vertical propulsion. Vertical propulsion units 1112 may be used during a hover mode wherein UAV 1110 is descending (e.g., to a delivery location) or ascending (e.g., following a delivery). Stabilizers 1108 (or fins) may be included with UAV 1100 to stabilize the UAV's yaw (left or right turns) during flight. In some embodiments, UAV 1100 may be configured to function as a glider. To do so, UAV 1100 may power off its propulsion units and glide for a period of time.

During flight, UAV 1100 may control the direction and/or speed of its movement by controlling its pitch, roll, yaw, and/or altitude. For example, the stabilizers 1108 may include one or more rudders 1108a for controlling the UAV's yaw, and wing assembly 1102 may include elevators for controlling the UAV's pitch and/or ailerons 1102a for controlling the UAV's roll. As another example, increasing or decreasing the speed of all the propellers simultaneously can result in UAV 1100 increasing or decreasing its altitude, respectively.

Many variations on the illustrated fixed-wing UAV are possible. For instance, fixed-wing UAVs may include more or fewer propellers, and/or may utilize a ducted fan or multiple ducted fans for propulsion. Further, UAVs with more wings (e.g., an "x-wing" configuration with four wings), are also possible. Although FIGS. 1A-1C illustrate just one wing assembly 1102, just two boom assemblies 1110, two forward propulsion units 1106, and six vertical propulsion units 1112 per boom assembly 1110, it should be appreciated that other variants of UAV 1100 may be implemented with more or less of these components. For example, UAV 1100 may include two wing assemblies 1102, four boom assemblies 1110, and more or less propulsion units (forward or vertical).

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

Figure 2:
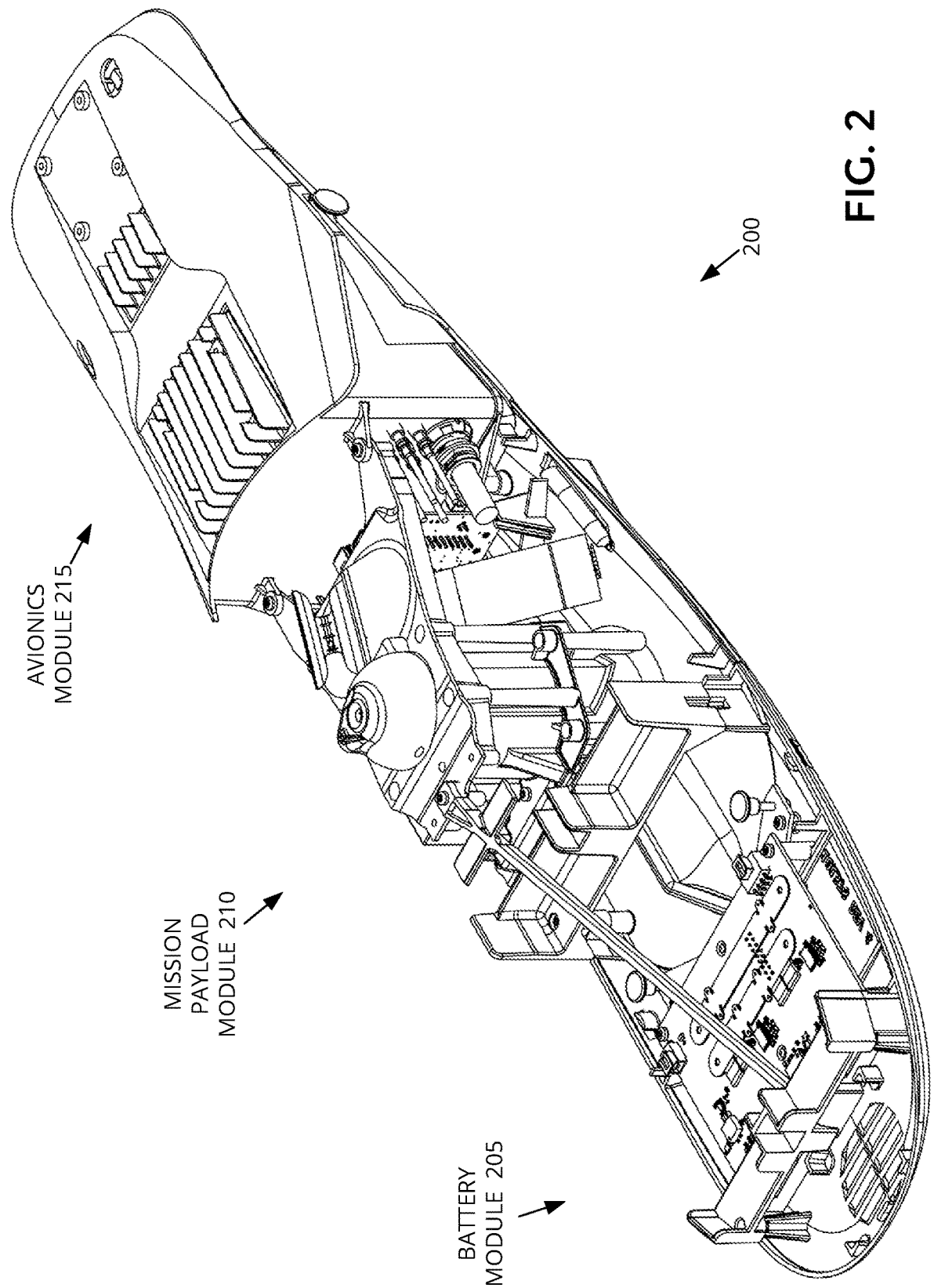
FIG. 2 is a perspective view illustration of an assembled modular fuselage, in accordance with an embodiment of the disclosure.
Figure 3:
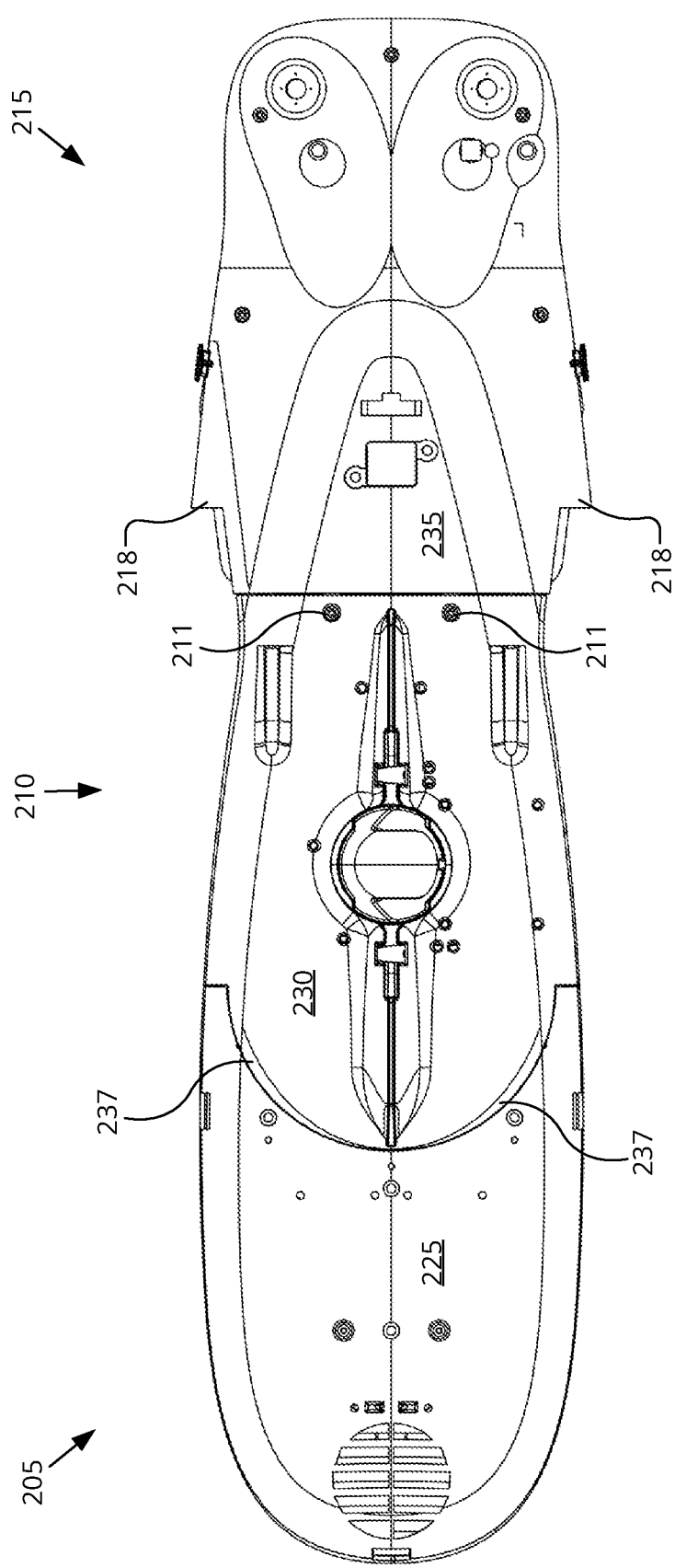
FIG. 3 is a bottom plan view illustration of the assembled modular fuselage, in accordance with an embodiment of the disclosure.
Figure 4A:
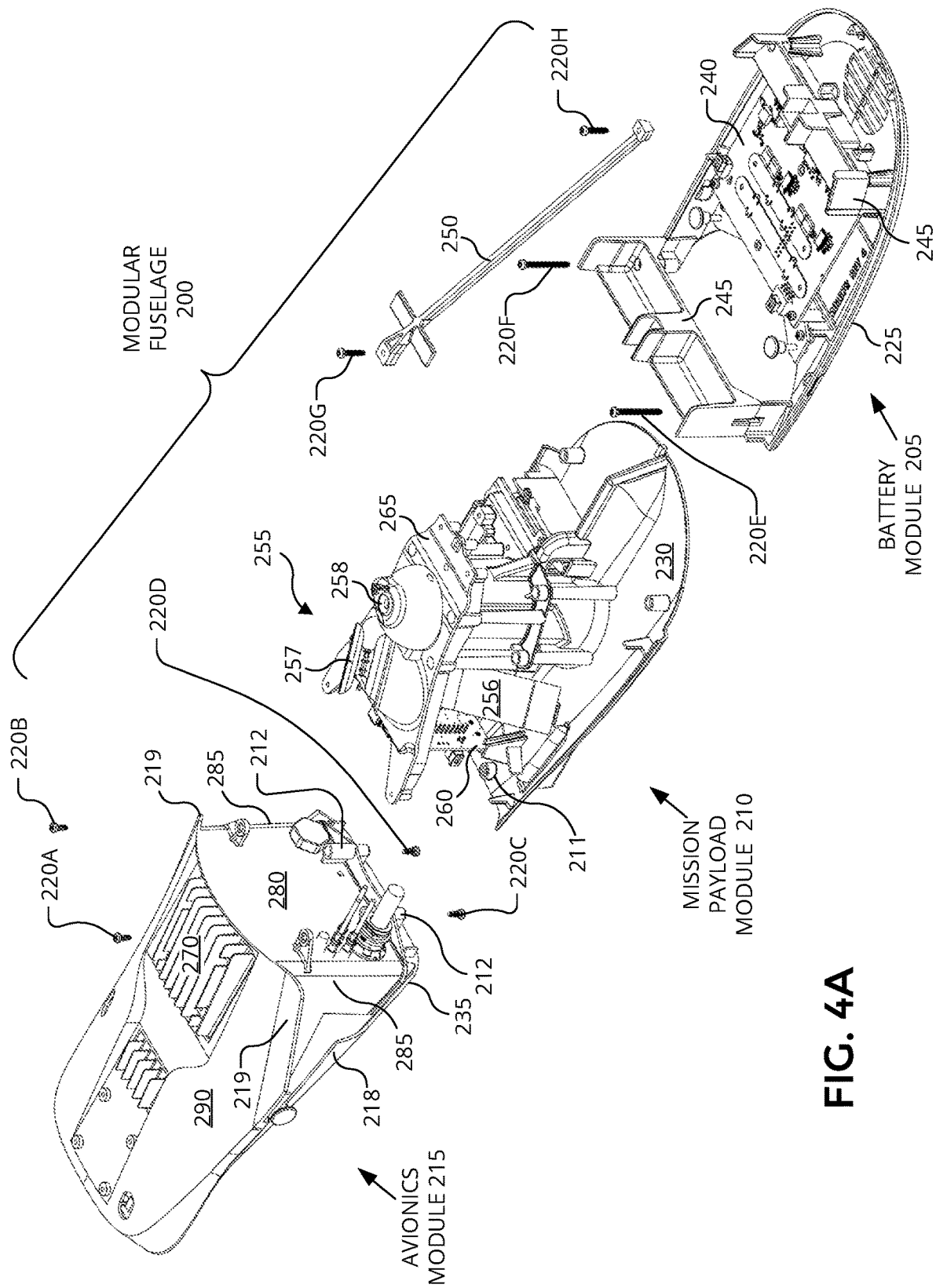

FIGS. 2, 3, 4A, and 4B illustrate a modular fuselage 200, in accordance with an embodiment of the disclosure. Modular fuselage 200 is one possible implementation of modular fuselage 1104 illustrated in FIG. 1A. FIG. 2 is a perspective view illustration of an assembled modular fuselage 200, FIG. 3 is a bottom plan view of the assembled modular fuselage 200, and FIGS. 4A and 4B are exploded view illustrations of the detached modules of modular fuselage 200.

Referring to FIGS. 4A and 4B, the illustrated embodiment of modular fuselage 200 includes a battery module 205 for housing a battery to power a UAV, a mission payload module 210 that houses equipment associated with a mission of the UAV, and an avionics module 215 for housing flight control circuitry of the UAV. Battery module 205, mission payload module 210, and avionics module 215 are shaped to secure to each other to form a contiguous and operational fuselage separate from being mechanically secured to wing assembly 1102 or boom assemblies 1110. This enables modular fuselage 200 to be assembled and operationally tested in isolation to the aerodynamic structures and systems on wing assembly 1102 and boom assemblies 1110. The modularity further enables the easy replacement of worn out or damaged modules, swapping modules (e.g., mission payload module) for a given UAV mission or flight, or updating particular modules without having to replace the entire UAV.

In the illustrated embodiment, the sections of modular fuselage 200 are mechanically secured to each other using mechanical fasteners 220A-H. When mated and secured together, battery module 205, mission payload module 210, and avionics module 215 form a contiguous fuselage with smooth continuous outer surfaces. For example, in the illustrated embodiment (see FIG. 3), undersides 225, 230, and 235, of battery module 205, mission payload module 210, and avionics module 215, respectively, have mating curvatures that form a single, contiguous, aerodynamic surface of the fuselage when mechanically secured to each other. In one embodiment, undersides 225, 230, and 235 also serve as skid plates. In the illustrated embodiment, a gap or slit 237 is retained between the mating undersides 225 and 230 to provide a drainage location for water that penetrates into modular fuselage 200.

Returning to FIG. 4A, the illustrated embodiment of battery module 205 includes power circuitry 240, battery brackets 245, a tensile support rod 250, and underside 225. The illustrated embodiment of mission payload module 210 includes a payload actuator 255, a payload controller 260, spar mounting bracket 265, and underside 230. Tensile support rod 250 is a detachable member that connects between spar mounting bracket 265 and a distal portion of battery module 205 to carry the battery loads to the wing spar.

The illustrated embodiment of payload actuator 255 includes a collinear motor 256, a gear reduction box, and a spool 257 for spooling a line (not illustrated) that passes through a guide hole 258. Payload actuator 255 operates to hold and release an externally attached payload via the line that extends below mission payload module 210. Although the illustrated embodiment of mission payload module 210 is configured for external payload deliver, other configurations may include a camera equipment holder, a sensor equipment holder (e.g., for holding radar equipment, lidar equipment, pollution monitoring equipment, weather monitoring equipment, etc.), an additional battery holder for extra onboard battery capacity, or otherwise.

The illustrated embodiment of avionics module 215 includes one or more of a processor, memory, and other communication, navigation, and avionic electronics (not illustrated), a heat sink 270, power and communication connectors 275, a torsion box formed by a roll shear wall 280 and pitch shear walls 285, underside 235, and a top cover 290. The torsion box provides rolling and pitching shear strength to mission payload module 210 through mechanical fasteners 220A, 220B, 220C, and 220D that secure avionics module 215 to mission payload module 210. Thus, roll shear wall 280 operates as a bulkhead between the adjacent modules that provides rigidity and shear strength to mission payload module 210, which may experience the greatest forces within the module fuselage when delivering heavy packages. Additionally, mechanical fasteners 220C and 220D not only connect avionics module 215 to mission payload module 210 and carry torsion forces from mission payload module 210 to the torsion box on avionics module 215, but also hold top cover 290 in place over avionics module 215. When connecting mission payload module 210 to avionics module 215, mechanical fasteners 220C and 220D insert through fastener holes 211 on underside 230 of mission payload module 210 and thread into fastener holes 212 connected to top cover 290 via roll shear wall 280. Accordingly, the illustrated design saves weight and achieves modularity by using mechanical fasteners 220C and 220D for several functions.

In the illustrated embodiments, battery module 205 is positioned as a fore section of modular fuselage 200, avionics module 215 is positioned as an aft section, and mission payload module 210 is positioned as a middle section. It should be appreciated that the positional assignments of battery module 205, mission payload module 210, and avionics module 215 may be swapped within module fuselage 200. For example, in alternative embodiments, an avionics module may be positioned fore and a battery module may be positioned aft.

FIGS. 5A to 5D illustrate different views of a fuselage cover 500, in accordance with an embodiment of the disclosure. Fuselage cover 500 forms part of the modular fuselage 1104 of UAV 1100 and operates as a body member and outer skin where exposed. In one embodiment, fuselage cover 500 is a foam member to keep weight down; however, other materials (e.g., plastic, aluminum, etc.) may be used. Fuselage cover 500 forms the front end of modular fuselage 1104, but also extends over a top portion and along side portions of battery module 205, along side portions of mission payload module 210, and along side portions of avionics module 215.

In the illustrated embodiment, fuselage cover 500 includes tongue portions 505. Tongue portions 505 extend beside avionics module 215 and are secured in place by channels formed by the gaps between flanges 218 and 219 and pitch shear walls 285. Flanges 218 are extension pieces of underside (or skid plate) 235 while flanges 219 are extension pieces of top cover 290. Flanges 218 hold tongue portions 505 against pitch shear walls 285. In other embodiments, fuselage cover 500 may be segmented into three sections corresponding to the three modules of the modular fuselage. For example, each cover section may be attached to its corresponding portion of the modular fuselage (e.g., front part of cover attached to the battery module, rear part of cover attached to the avionic module, etc.). In one embodiment, the cover sections are integral or permanently attached to their respective portions of the modular fuselage.

Figure 6A:
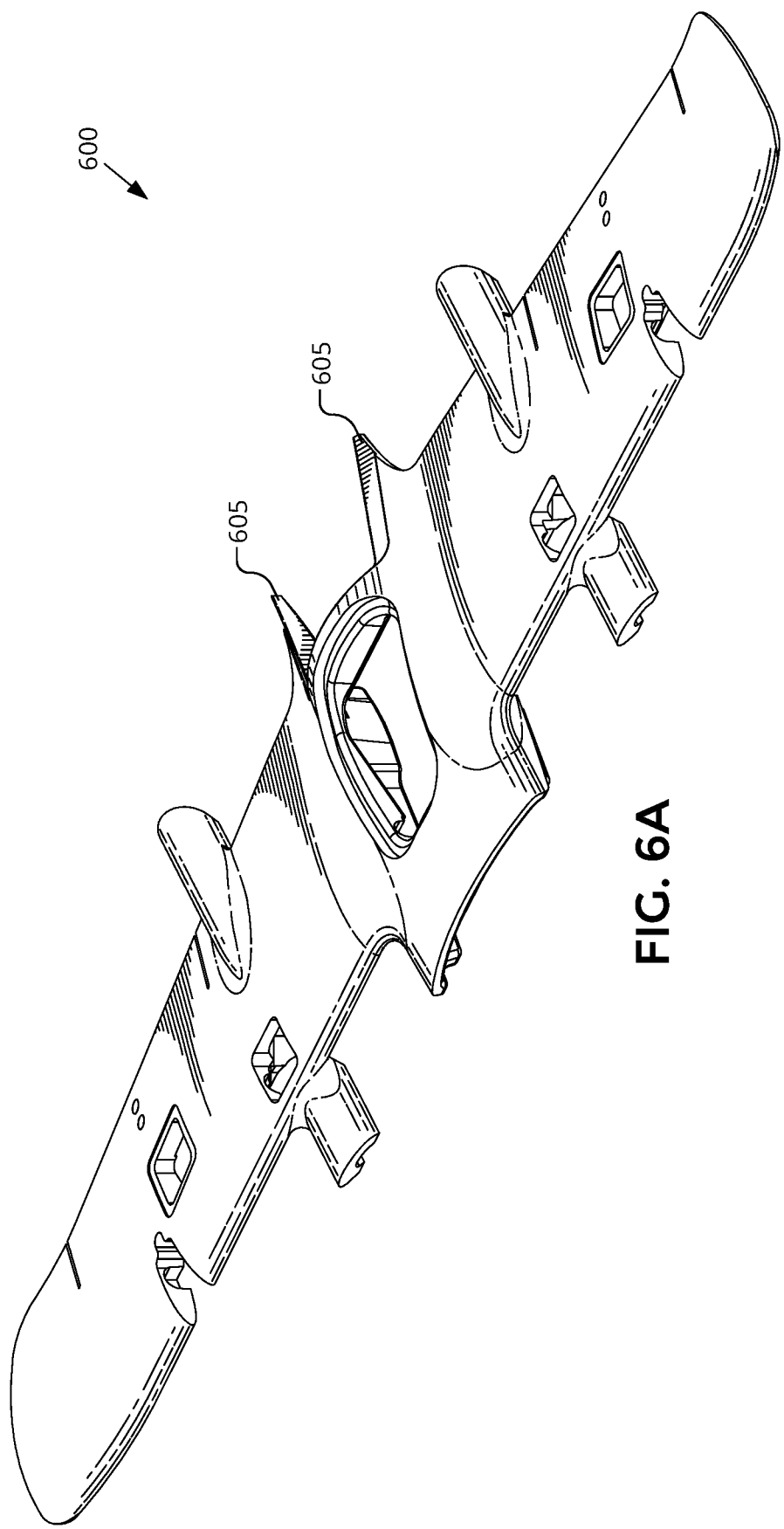
FIG. 6A is a perspective view illustration of a wing foil, in accordance with an embodiment of the disclosure.
Figure 6B:
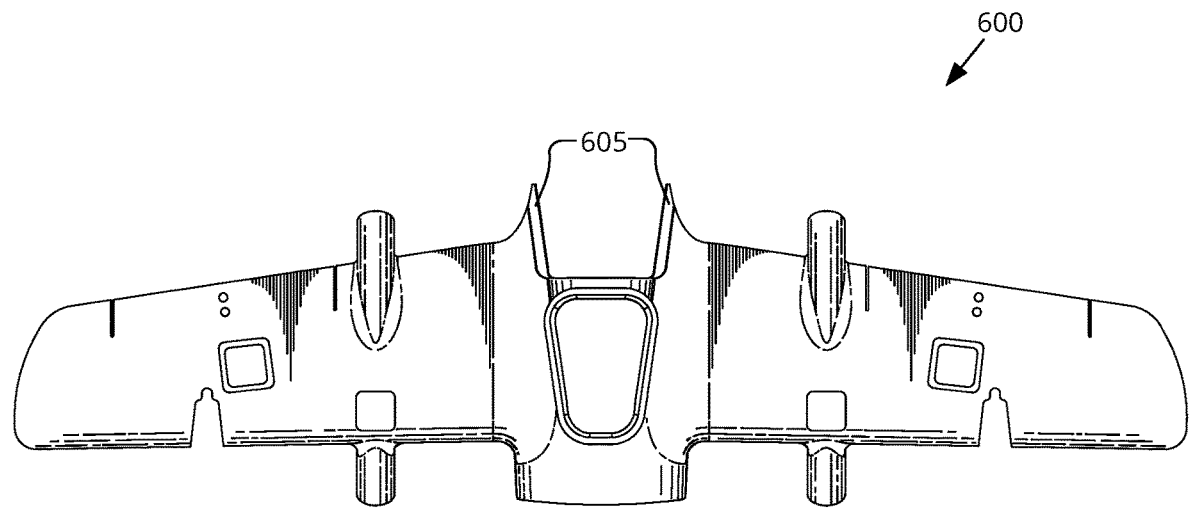
FIGS. 6B & 6C are top and bottom plan view illustrations, respectively, of the wing foil, in accordance with an embodiment of the disclosure.
Figure 6C:
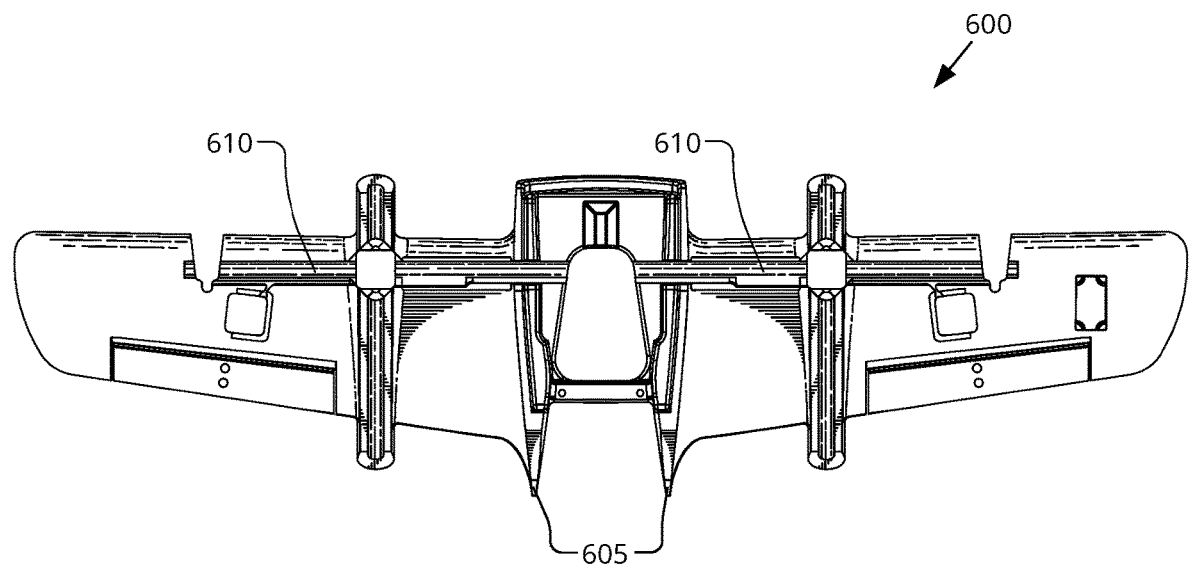

FIGS. 6A-C illustrate various views of a wing foil 600, in accordance with an embodiment of the disclosure. Wing foil 600 is one possible implementation of a portion of wing assembly 1102 illustrated in FIGS. 1A-C. Similar to fuselage cover 500, wing foil 600 includes tongue portions 605 shaped to fit into the gaps between flanges 218 and 219 and pitch shear walls 285. In particular, flanges 219 hold tongue portions 605 against pitch shear walls 285. FIG. 6C further illustrates an interior channel 610 along which the wing spar of the wing assembly is housed.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A modular fuselage for an unmanned aerial vehicle (UAV), comprising:
   a battery module for housing a battery to power the UAV;
   an avionics module that houses flight control circuitry of the UAV; and
   a mission payload module that houses equipment associated with a mission of the UAV, wherein the battery module, the avionics module, and the mission payload module are detachable from each other and mechanically securable to each other to contiguously form at least a portion of the modular fuselage of the UAV, wherein undersides of the battery module, the avionics module, and the mission payload module have mating curvatures that collectively form an external surface of the modular fuselage when mechanically secured to each other, wherein the mission payload module comprises a middle section of the modular fuselage disposed between the battery module and the avionics module, wherein the battery module comprise a fore section of the modular fuselage and a detachable tensile support rod connects a distal portion of the battery module to the mission payload module to carry loads from the battery module to the mission payload module, wherein the mission payload module includes a spar mounting bracket for securing a wing spar to the modular fuselage and wherein the detachable tensile support rod connects between the spar mounting bracket and the distal portion of the battery module to carry the loads from the battery module to the wing spar when connected via the spar mounting bracket.

2. The modular fuselage of claim 1, wherein the battery module, the avionics module, and the mission payload module are shaped to secure to each other to form the modular fuselage, and wherein the battery module, the avionics module, and the mission payload module are arrangeable into the modular fuselage separate from and prior to attaching a wing of the UAV to the modular fuselage.

3. The modular fuselage of claim 1, wherein the mission payload module includes a mounting bracket for securing a wing assembly of the UAV to the modular fuselage.

4. The modular fuselage of claim 3, wherein the avionics module comprises an aft section of the modular fuselage.

5. The modular fuselage of claim 1, wherein the mission payload module comprises one of: a payload actuator for holding and releasing an externally attached payload, a camera equipment holder, a sensor equipment holder, or an additional battery holder.

6. The modular fuselage of claim 1, wherein the modular fuselage further includes:
a fuselage cover that extends over a top portion and along first side portions of the battery module, along second side portions of the mission payload module, and along third side portions of the avionics module,
wherein a bottom skid plate of the avionics module forms channels with the third side portions of the avionics module into which tongue portions of the fuselage cover are secured.

7. The modular fuselage of claim 1, wherein the battery module, the avionics module, and the mission payload module are mechanically securable to each other using mechanical fasteners.

8. The modular fuselage of claim 7, wherein the avionics module includes a first set of fastener holes that align with a second set of fastener holes on an underside of the mission payload module when the avionics module is secured to the mission payload module with first and second mechanical fasteners that insert into the first and second sets of fastener holes from the underside of the mission payload module, and wherein the first and second mechanical fasteners also hold a top cover of the avionics module in place over the avionics module.

9. The modular fuselage of claim 7, wherein the avionics module includes a torsion box including a roll shear wall and a pitch shear wall that provide rolling and pitching shear strength to the mission payload module through a subset of the mechanical fasteners that secure the avionics module to the mission payload module.

10. An unmanned aerial vehicle (UAV), comprising:
a wing assembly to provide lift;
a plurality of boom assemblies that secure to the wing assembly, each of the boom assemblies including a plurality of propellers to provide vertical propulsion; and
a modular fuselage mountable to the wing assembly, the modular fuselage including:
a battery module for housing a battery to power the UAV;
an avionics module that houses flight control circuitry of the UAV; and
a mission payload module that houses equipment associated with a mission of the UAV,
wherein the battery module, the avionics module, and the mission payload module are detachable from each other and mechanically securable to each other to contiguously form at least a portion of the modular fuselage of the UAV,
wherein the battery module, the avionics module, and the mission payload module each form a portion of an external surface of the modular fuselage when mechanically secured to each other.

11. The UAV of claim 10, wherein the battery module, the avionics module, and the mission payload module are shaped to secure to each other to form the modular fuselage separate from being mechanically secured to the wing assembly or the boom assemblies.

12. The UAV of claim 10, wherein undersides of the battery module, the avionics module, and the mission payload module form the external surface of the modular fuselage when mechanically secured to each other.

13. The UAV of claim 10, wherein the mission payload module comprises a middle section of the modular fuselage and wherein the wing assembly mounts to the mission payload module.

14. The UAV of claim 13, wherein the battery module comprises a fore section of the modular fuselage and the avionics module comprises an aft section of the modular fuselage.

15. The UAV of claim 13, wherein the wing assembly includes a wing spar disposed within a wing foil that mounts to a spar mounting bracket on the mission payload module and wherein the battery module includes a detachable tensile support rod that connects between the spar mounting bracket and a distal portion of the battery module to carry loads from the battery module to the wing spar.

16. The UAV of claim 10, wherein the mission payload module comprises one of: a payload actuator for holding and releasing an externally attached payload, camera equipment holder, a sensor equipment holder, or an additional battery holder.

17. The UAV of claim 10, wherein the modular fuselage further includes:
a fuselage cover that extends over a top portion and along first side portions of the battery module, along second side portions of the mission payload module, and along third side portions of the avionics module,
wherein a bottom skid plate and a top cover of the avionics module form channels with the third side portions of the avionics module into which tongue portions of the fuselage cover and tongue portions of a wing foil of the wing assembly are secured.

18. The UAV of claim 10, wherein the battery module, the avionics module, and the mission payload module are mechanically securable to each other using mechanical fasteners.

19. The UAV of claim 18, wherein the avionics module includes a first set of fastener holes that align with a second set of fastener holes on an underside of the mission payload module when the avionics module is secured to the mission payload module with first and second mechanical fasteners that insert into the first and second sets of fastener holes from the underside of the mission payload module, and wherein the first and second mechanical fasteners also hold a top cover of the avionics module in place over the avionics module.

20. The UAV of claim 18, wherein the avionics module includes a torsion box including a roll shear wall and a pitch shear wall that provide rolling and pitching shear strength to the mission payload module through a subset of the mechanical fasteners that secure the avionics module to the mission payload module.

21. A modular fuselage for an unmanned aerial vehicle (UAV), comprising:
a battery module for housing a battery to power the UAV;
an avionics module that houses flight control circuitry of the UAV; and
a mission payload module that houses equipment associated with a mission of the UAV,
wherein the battery module, the avionics module, and the mission payload module are detachable from each other and mechanically securable to each other to contiguously form at least a portion of the modular fuselage of the UAV,
wherein the modular fuselage further includes a fuselage cover that extends over a top portion and along first side portions of the battery module, along second side portions of the mission payload module, and along third side portions of the avionics module,
wherein a bottom skid plate of the avionics module forms channels with the third side portions of the avionics module into which tongue portions of the fuselage cover are secured.

22. An unmanned aerial vehicle (UAV), comprising:
a wing assembly to provide lift;
a plurality of boom assemblies that secure to the wing assembly, each of the boom assemblies including a plurality of propellers to provide vertical propulsion; and
a modular fuselage mountable to the wing assembly, the modular fuselage including:
a battery module for housing a battery to power the UAV;
an avionics module that houses flight control circuitry of the UAV; and
a mission payload module that houses equipment associated with a mission of the UAV,
wherein the battery module, the avionics module, and the mission payload module are detachable from each other and mechanically securable to each other to contiguously form at least a portion of the modular fuselage of the UAV,
wherein the wing assembly includes a wing spar disposed within a wing foil that mounts to a spar mounting bracket on the mission payload module and wherein the battery module includes a detachable tensile support rod that connects between the spar mounting bracket and a distal portion of the battery module to carry loads from the battery module to the wing spar.

23. A modular fuselage for an unmanned aerial vehicle (UAV), comprising:
a battery module for housing a battery to power the UAV;
an avionics module that houses flight control circuitry of the UAV; and
a mission payload module for housing equipment associated with a mission of the UAV,
wherein the battery module, the avionics module, and the mission payload module are detachable from each other and mechanically securable to each other to contiguously form at least a portion of the modular fuselage of the UAV,
wherein the avionics module includes a first set of fastener holes that align with a second set of fastener holes on an underside of the mission payload module when the avionics module is secured to the mission payload module with first and second mechanical fasteners that insert into the first and second sets of fastener holes from the underside of the mission payload module, and wherein the first and second mechanical fasteners also hold a top cover of the avionics module in place over the avionics module.

24. A modular fuselage for an unmanned aerial vehicle (UAV), comprising:
a battery module for housing a battery to power the UAV;
an avionics module that houses flight control circuitry of the UAV; and
a mission payload module that houses equipment associated with a mission of the UAV,
wherein the battery module, the avionics module, and the mission payload module are detachable from each other and mechanically securable to each other to contiguously form at least a portion of the modular fuselage of the UAV,
wherein the avionics module includes a torsion box including a roll shear wall and a pitch shear wall that provide rolling and pitching shear strength to the mission payload module through mechanical fasteners that secure the avionics module to the mission payload module.

* * * * *